(12) United States Patent
Tallman et al.

(10) Patent No.: US 6,275,257 B1
(45) Date of Patent: Aug. 14, 2001

(54) HOLDOFF BY TV FIELDS

(75) Inventors: James L. Tallman; Murlan R. Kaufman, both of Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/173,846

(22) Filed: Oct. 16, 1998

(51) Int. Cl.$^7$ .............................. H04N 17/00; G01R 1/38; G01R 13/20
(52) U.S. Cl. ........................ 348/184; 348/180; 348/184; 348/181; 348/185; 348/187; 324/115; 324/121; 702/66
(58) Field of Search ...................... 348/180, 181, 348/184, 185, 187; 345/134, 133, 135, 147, 148, 149; 324/121, 511, 115; 702/66–78

(56) References Cited

U.S. PATENT DOCUMENTS

| | | | | |
|---|---|---|---|---|
| 4,647,862 | * | 3/1987 | Blair | 328/109 |
| 4,704,691 | * | 11/1987 | Blair | 364/487 |
| 4,743,844 | * | 5/1988 | Odenheimer et al. | 324/121 |
| 4,980,605 | * | 12/1990 | Bradford et al. | 315/1 |
| 5,027,058 | * | 6/1991 | Kleck et al. | 324/121 |
| 5,172,229 | * | 12/1992 | Baker | 358/139 |
| 5,268,851 | * | 12/1993 | Zivny | 364/481 |
| 5,347,540 | * | 9/1994 | Karrick | 375/10 |
| 5,471,159 | * | 11/1995 | Stuebing et al. | 327/24 |
| 5,530,454 | * | 6/1996 | Etheridge et al. | 345/134 |
| 5,841,286 | * | 11/1998 | Stoops | 324/511 |
| 5,986,637 | * | 11/1999 | Etheridge et al. | 345/134 |

* cited by examiner

Primary Examiner—Reinhard J. Eisenzopf
Assistant Examiner—Paulos M. Natnael
(74) Attorney, Agent, or Firm—Thomas F. Lenihan

(57) ABSTRACT

An apparatus and method useful in a test and measurement instrument for selecting a particular television field for display, determines the television system standard from the input signal, uses the standard selection to determine the time for one field, and multiplies the field rate by an operator-supplied number of fields to calculate the required holdoff time. The subject invention relieves the operator from turning the holdoff control multiple times, and also relieves the operator from having to calculate the time delays for any of one to seven fields of holdoff (in the case of a PAL signal).

5 Claims, 5 Drawing Sheets

HOLDOFF BY TV FIELDS

FIELD OF THE INVENTION

The subject invention concerns triggering in test and measurement instruments in general, and concerns television field rate triggering, in particular.

BACKGROUND OF THE INVENTION

Oscilloscopes acquire and display a record of data upon the occurrence of a particular trigger. The trigger event may occur within the signal of interest, or it may be desirable to observe a first signal while being triggered by an occurrence in a second signal. It frequently happens that a particular area of interest that the user wishes to observe, happens to be displaced in time from the trigger event. In order to observe the particular area of interest, the oscilloscope acquisition and display must be delayed by some well-defined time period. The time period is usually set by rotation of a timebase control on the front panel of the oscilloscope. In such a system, the trigger begins a time period, and acquisition and display of the waveform to be observed occurs at the expiration of the time period. This delay function is generally called holdoff and is well-known in the oscilloscope art.

A general-purpose oscilloscope is a versatile test and measurement instrument which has wide-spread application, spanning many technological fields. Notwithstanding the breadth of their application, there are some application specific functions which are commonly found on general-purpose oscilloscopes. One such set of application specific functions relate to acquisition and display of television signals.

Television signals generally comprise a plurality of television lines organized into interlaced fields. Each television line signal includes horizontal synchronizing information, color burst (color synchronizing information), and video information. Each field contains vertical synchronizing information. Two interlaced fields form a complete picture called a frame. In the NTSC television system, odd fields begin a trace at the left end of the top of the frame, and end at the center of the bottom of the frame. Even fields begin at the center of the top of the frame and end at the right end of the bottom of the frame. Thus, each field comprises 262.5 television lines. In NTSC, the fields follow a four field repeating sequence (in the PAL system, the fields follow an eight field repeating sequence). Fields 1 and 3 have the same timing, but differ from each other in that phase of their respective color burst components is offset by 180 degrees. As noted above, fields 2 and 4 differ in timing from fields 1 and 3. Fields 2 and 4 have the same timing with respect to each other, but differ from each other in that phase of their respective color burst components is offset by 180 degrees.

Many oscilloscopes have the capability of selectively triggering on just the odd (i.e., 1 and 3) or even (i.e., 2 and 4) fields. However, some oscilloscopes do not have the capability to distinguish field 1 from field 3, or field 2 from field 4. This inability to distinguish individual fields causes the oscilloscope to trigger on every odd or every even field. This unwanted dual triggering causes an overlapping display of lines from both odd or both even fields. If one is interested in observing the color burst component, what is seen is a mixture of both phases.

A common solution to this problem is to use the holdoff feature of the oscilloscope. The operator sets the trigger to ODD, but sets the holdoff to prevent triggering on the next odd field. For NTSC, the required holdoff is two fields (one frame) or 33.4 ms. For the PAL system, the holdoff is also two fields but the different vertical scan rate causes the time delay to equal 40 ms.

The holdoff resolution is a function of the timebase setting. If the timebase is set at a fast position (e.g., 1 $\mu s$), then the holdoff resolution is 200 ns. Disadvantageously, it takes many turns of the holdoff control to reach the required two-field delay. Moreover, "dual standard houses" that do post production work in both NTSC and PAL would need to use a different time delay for each standard.

What is needed is an apparatus and method for quickly and easily selecting a particular television field for display.

SUMMARY OF THE INVENTION

An apparatus and method useful in a test and measurement instrument for selecting a particular television field for display, determines the television system standard from externally supplied data, or from a measurement of the input signal itself, uses the standard to determine the time for one field, and multiplies the field rate by an operator-supplied number of fields to calculate the required holdoff time. The subject invention relieves the operator from turning the holdoff control multiple times, and also relieves the operator from having to calculate the time delays for any of one to seven fields of holdoff (in the case of a PAL signal).

DETAILED DESCRIPTION OF THE EMBODIMENT

Figure 1:
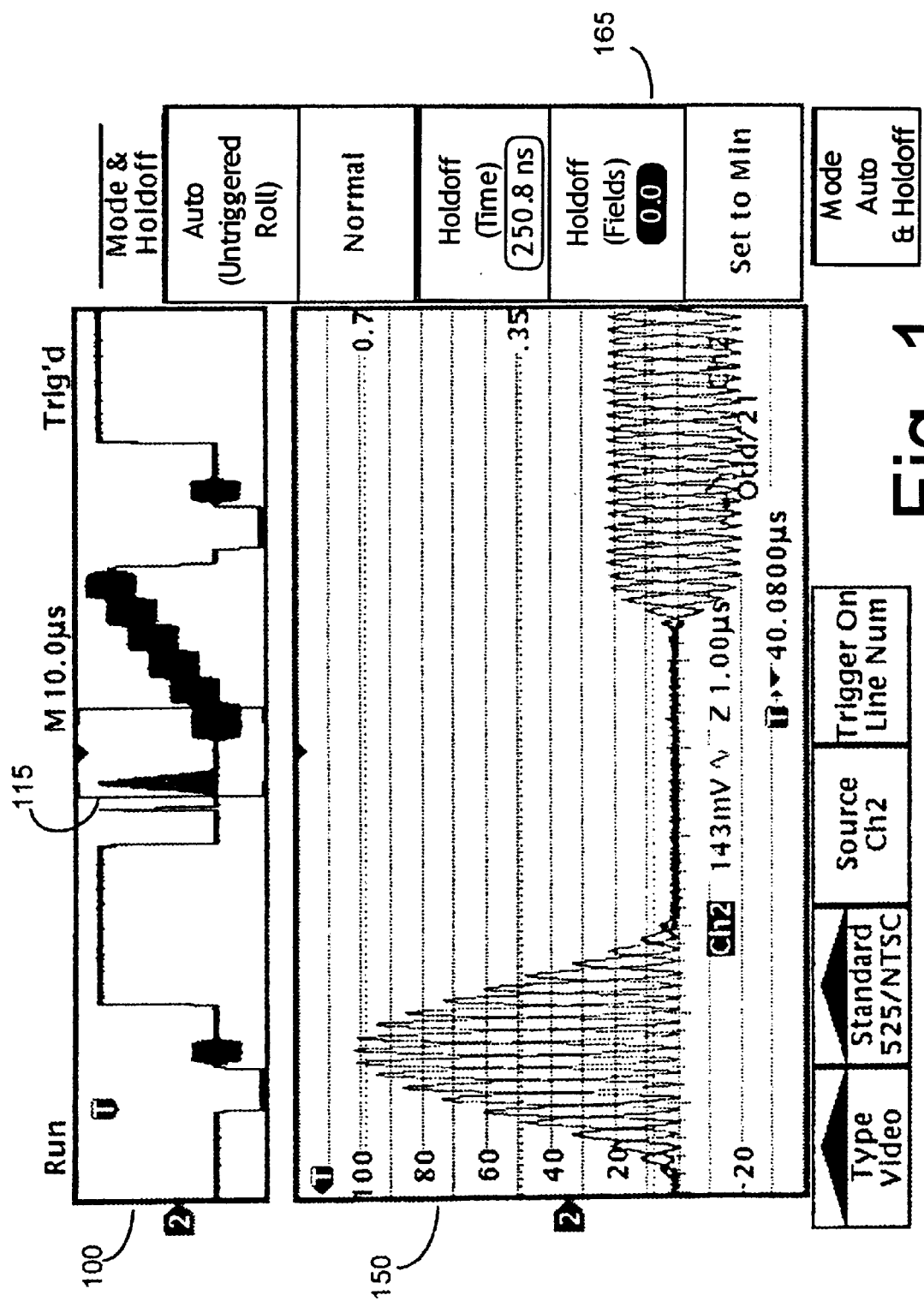
FIG. 1 shows a first display useful in understanding the invention.

FIG. 1 is an illustration of a screen display showing the problem to be solved. In this case the oscilloscope has been set up to trigger on all ODD fields and manual holdoff has not been used. The television line waveform being observed is shown in a small screen window 100. An area of that signal has been enclosed in a box 115 for expansion in the large screen display area 150. The color components of the signal show both the in-phase and out-of-phase versions due to overlapping of fields 1 and 3. Note that the Holdoff by Fields indicator 165 shows no holdoff.

Figure 2:
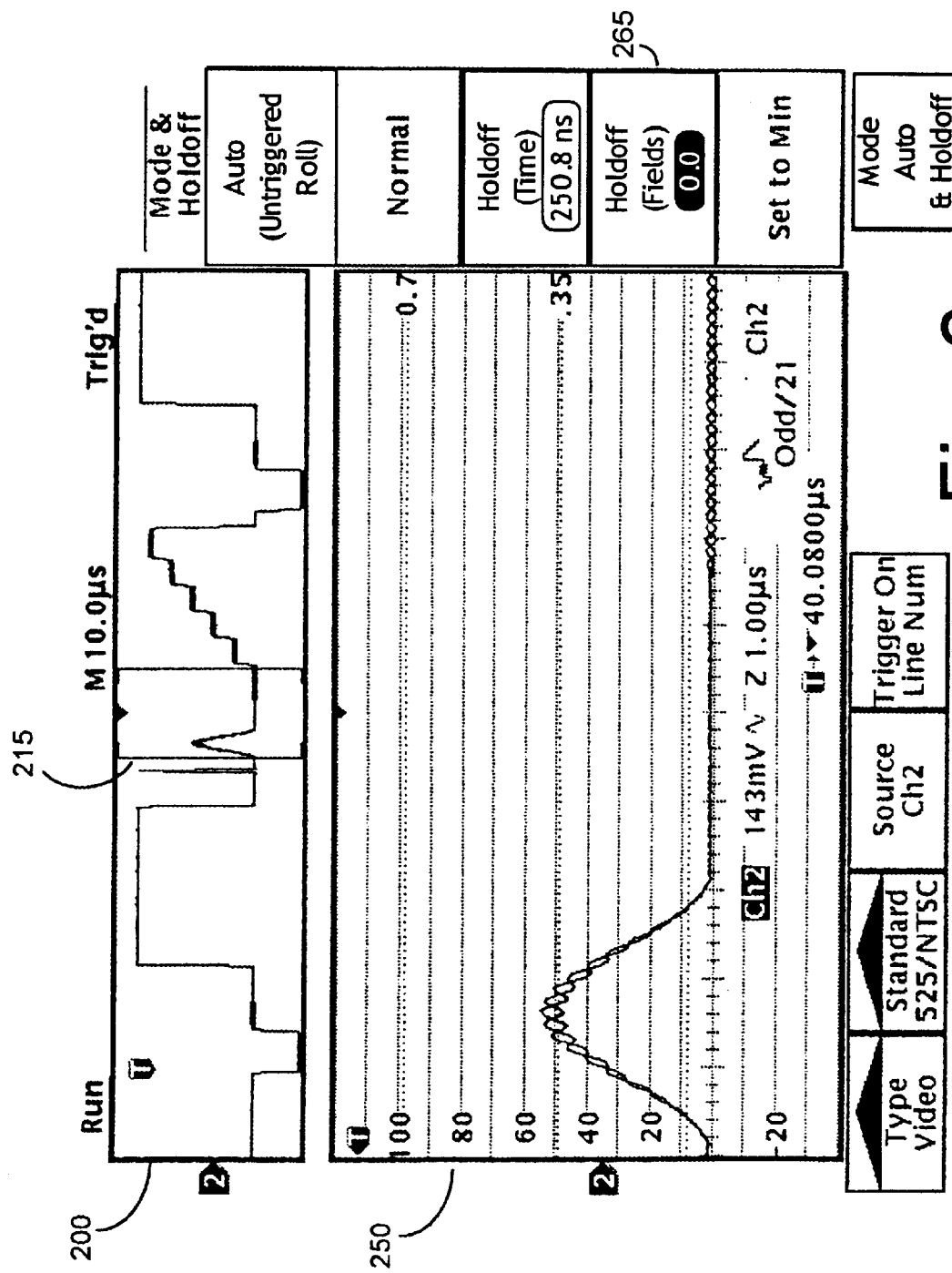
FIG. 2 shows a second display useful in understanding the invention.

FIG. 2 is an illustration of a screen display showing the average of the waveforms of FIG. 1. Once again, the oscilloscope has been set up to trigger on all ODD fields and manual holdoff has not been used. The television line waveform being observed is shown in a small screen window 200. An area of that signal has been enclosed in a box 215 for expansion in the large screen display area 250. The average of the in-phase and out-of-phase color components of the signal produces a haystack-shaped waveform which is unsuitable for meaningful measurement. Note that the Holdoff by Fields indicator 265 shows no holdoff.

Figure 3:
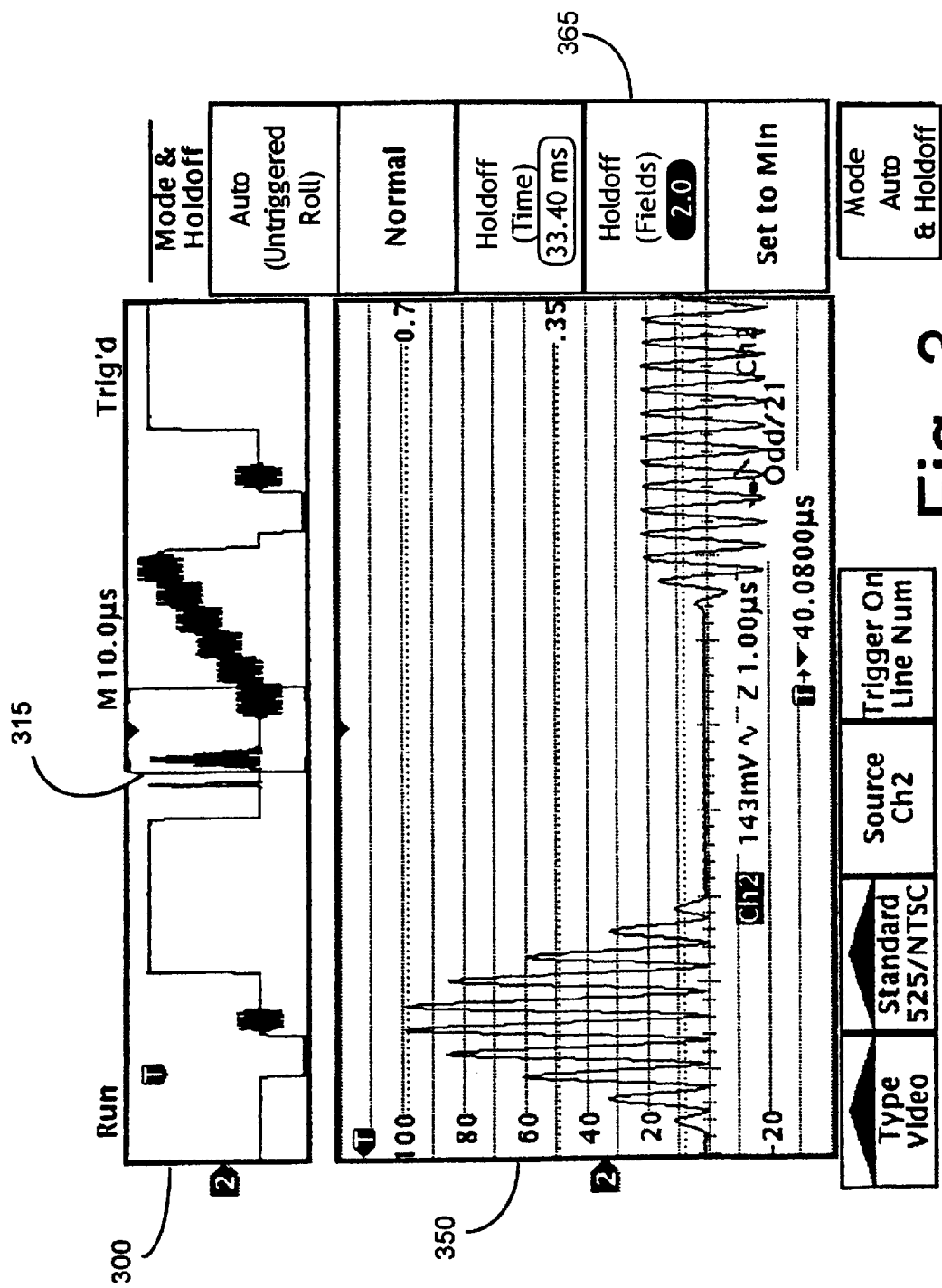
FIG. 3 shows a third display in accordance with the invention.

FIG. 3 is an illustration of a screen in accordance with the subject invention. In this case the oscilloscope has been set up to trigger on all ODD fields and a holdoff by fields number has been entered. The television line waveform being observed is shown in a small screen window 300. An area of that signal has been enclosed in a box 315 for expansion in the large screen display area 350. The color components of the signal show only the in-phase version due to overlapping of only repeats of field 1. Note that the Holdoff by Fields indicator 365 shows the number 2.0, indicating a holdoff of 2 fields (one frame).

Figure 4:
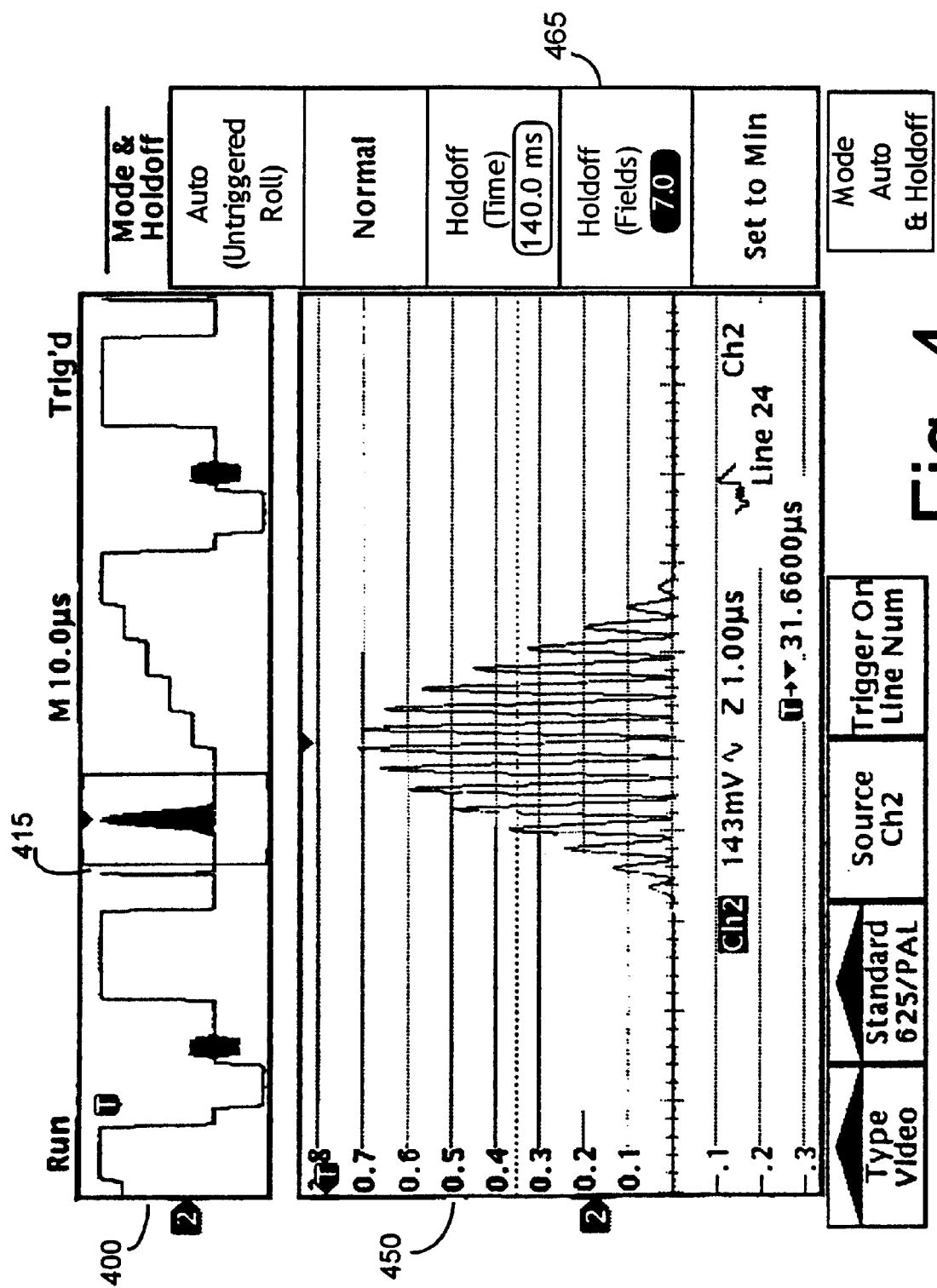
FIG. 4 shows a fourth screen display in accordance with the invention.

FIG. 4 is an illustration of a screen in accordance with the subject invention, and useful for PAL television signals. In this case the oscilloscope has been set up to trigger on all ODD fields and a holdoff by fields number has been entered. The television line waveform being observed is shown in a small screen window 400. An area of that signal has been enclosed in a box 415 for expansion in the large screen display area 450. The color components of the signal show only a single phase due to overlapping of only repeats of the same field. Note that the Holdoff by Fields indicator 465 shows the number 7.0, indicating a holdoff of 7 fields.

Figure 5:
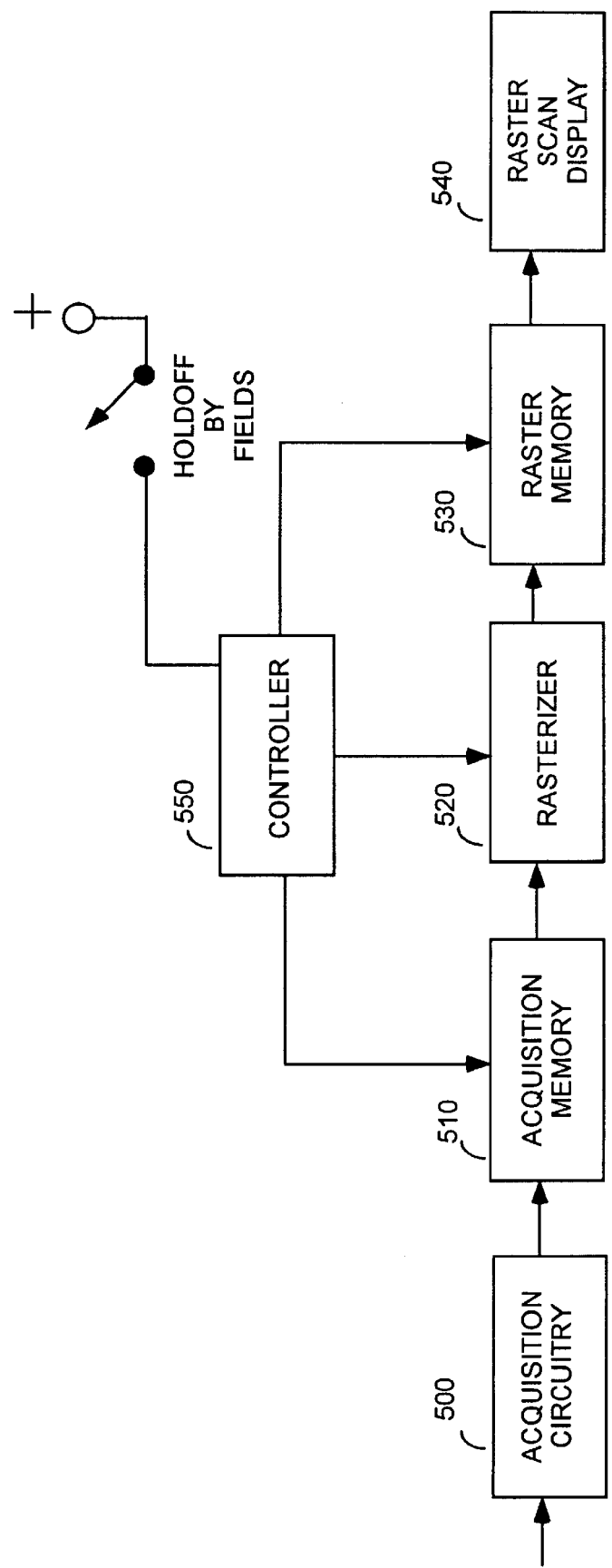
FIG. 5 shows circuitry in accordance with the invention.

FIG. 5 shows, in simplified block diagram form, hardware suitable for use with the invention. Input signals to be displayed are applied to the input terminal of Acquisition Circuitry 500. Acquisition circuitry 500 also includes an A/D converter (not shown) for taking digital samples of the incoming signal. Acquisition circuitry 500 develops digital bi-level signals and applies them to an acquisition memory 510 for storage. Under control of a Controller 550, a Rasterizer 520 arranges the data retrieved from Acquisition memory 510 into a format suitable for display on a Raster Scan Display 540. The formatted data is the stored in a Raster Memory 530 for use by the Raster Scan Display 540, as needed.

A switch (or key, or selector), labelled Holdoff by Fields, is connected between a source of supply voltage (or reference potential) and an input terminal of controller 550. Each press of the Holdoff by Fields key causes the controller to advance the count of the holdoff fields by one, up to a maximum count of seven, and thereafter to wrap around to a count of zero again. When the key is released, controller 550 uses the entered number to compute the delay necessary to accomplish a holdoff for the desired number of fields. In order to calculate the proper delay, controller 550 must know which television standard is being employed. Knowledge of the standard may be input directly by the user, who should know which television standard his signals belong to. Alternatively, it is herein recognized that the input television signal itself could be measured to determine its standard. The delay calculation is performed by multiplying the number of holdoff fields desired by the time period of one field. Having computed the delay, controller 550 applies the delay upon the occurrence of the next trigger.

What has been described is an apparatus and method for quickly and selectively triggering on a single field of video signal, without causing the operator to perform any calculations, or repeatedly turn holdoff control knobs.

The term "controller" as applied to element 550 is intended to include a microcomputer, or a microprocessor, and is also intended to encompass other forms of controllers such as dedicated hardware controllers including ASICs.

The term "selector" as used herein refers to any control operable by a user to select a function. The term "selector" is intended to include physical keys, softkeys, touch screens, rotary selectors, and menu driven systems.

While the invention has been described with respect to a digital oscilloscope, it is herein recognized that it would is also applicable to other types of test and measurement equipment, such as spectrum analyzers, logic analyzers, and the like, and such modification is deemed to lie within the scope of the following claims.

What is claimed is:

1. An oscilloscope, comprising:

an input for receiving a television signal to be measured;

a data acquisition unit for acquiring samples of said television signal;

a controller coupled to said data acquisition device for receiving digital data therefrom, said controller determining a television system standard to which said television signals belong;

a display device, coupled to said controller, for displaying waveforms representative of said acquired samples; and a selecting device for selecting a number of holdoff fields from a plurality numbers representative of holdoff fields;

wherein said controller computes a delay from said determination of said television system standard, and from said number of holdoff fields, and utilizes said delay to delay triggering of said oscilloscope.

2. The oscilloscope of claim 1 wherein, said determination of said television standard is made in response to input by a user.

3. The oscilloscope of claim 2 wherein, said determination of said television standard is made in response to a measurement of said input signal.

4. An electronic test and measurement instrument, comprising:

an input for receiving a television signal to be measured;

a data acquisition unit for acquiring samples of said television signal;

a controller coupled to said data acquisition device for receiving digital data therefrom, said controller determining a television system standard to which said television signals belong;

a display device, coupled to said controller, for displaying waveforms representative of said acquired samples; and an input for receiving data representative of a number of holdoff fields;

wherein said controller computes a delay from said determination of said television system standard, and from said data representative of said number of holdoff fields, and utilizes said delay to delay triggering of said electronic test and measurement equipment.

5. A method of providing holdoff by fields for an oscilloscope, comprising the steps of:

receiving a television signal to be measured;

acquiring samples of said television signal;

entering a desired number of holdoff fields;

determining a television system standard to which said television signal belong;

determining a period of one field of said television signal;

calculating a holdoff delay by multiplying said period of said one field by said number of holdoff fields;

employing said delay to delay triggering of said oscilloscope; and thereafter displaying waveforms representative of said acquired samples.

* * * * *